US009234600B2

(12) United States Patent
Thiele

(10) Patent No.: US 9,234,600 B2
(45) Date of Patent: Jan. 12, 2016

(54) PIPE BREAK VALVE DEVICE

(75) Inventor: Ewald Thiele, Neuenstadt (DE)

(73) Assignee: HORST THIELE MASCHINENBAU-HYDRAULISCHE GERATE GMBH, Neuenstadt (DE)

(*) Notice: Subject to any disclaimer, the term of this patent is extended or adjusted under 35 U.S.C. 154(b) by 456 days.

(21) Appl. No.: 13/557,880

(22) Filed: Jul. 25, 2012

(65) Prior Publication Data
US 2013/0025712 A1 Jan. 31, 2013

(30) Foreign Application Priority Data

Jul. 26, 2011 (DE) .......................... 10 2011 108 430

(51) Int. Cl.
*F16K 17/30* (2006.01)
*F16K 17/04* (2006.01)
*F16K 21/10* (2006.01)

(52) U.S. Cl.
CPC ............. *F16K 17/30* (2013.01); *F16K 17/0433* (2013.01); *F16K 21/10* (2013.01); *Y10T 137/7727* (2015.04); *Y10T 137/7785* (2015.04); *Y10T 137/7792* (2015.04); *Y10T 137/785* (2015.04); *Y10T 137/7869* (2015.04); *Y10T 137/7929* (2015.04)

(58) Field of Classification Search
CPC ..... F16K 17/28; F16K 17/30; F16K 17/0433; F16K 21/10; Y10T 137/7727; Y10T 137/7785; Y10T 137/7792; Y10T 137/7869; Y10T 137/785; Y10T 137/7929
USPC .................................. 137/460, 498, 517, 504
See application file for complete search history.

(56) References Cited

U.S. PATENT DOCUMENTS

| | | | | | |
|---|---|---|---|---|---|
| 2,138,719 | A | * | 11/1938 | Wright | 137/498 |
| 2,245,271 | A | * | 6/1941 | Guill | 137/517 |
| 2,601,654 | A | * | 6/1952 | Wright | 137/515 |
| 2,699,799 | A | | 1/1955 | Wager | |
| 2,729,235 | A | * | 1/1956 | Stevenson | 137/498 |
| 2,833,117 | A | * | 5/1958 | Wilcocks | 60/580 |
| 2,967,543 | A | * | 1/1961 | Viergutz | 137/484.2 |
| 3,196,902 | A | * | 7/1965 | Richmond | 137/504 |
| 3,995,656 | A | | 12/1976 | Mills, Jr. | |
| 5,507,466 | A | | 4/1996 | Yowell et al. | |
| 5,692,476 | A | * | 12/1997 | Egler et al. | 123/456 |
| 6,513,545 | B2 | | 2/2003 | Rhone et al. | |
| 7,591,282 | B1 | | 9/2009 | Achterman | |
| 2004/0060600 | A1 | * | 4/2004 | Choate et al. | 137/529 |

FOREIGN PATENT DOCUMENTS

DE 2352826 A1 5/1974
DE 102009043568 A1 4/2011
(Continued)

*Primary Examiner* — John K Fristoe, Jr.
*Assistant Examiner* — Josephine Trinidad-Borges
(74) *Attorney, Agent, or Firm* — Leason Ellis LLP

(57) ABSTRACT

A pipe break valve device includes a housing that has a recess continuous in a flow direction, a valve slide that is arranged displaceably in the flow direction in the recess, and a spatial volume of a throttle device that is arranged at least in regions between the outer wall of the valve slide and the inner wall of the housing. Throttle ducts that are present on the inlet side and on the outlet side are formed by a first gap and a second gap which are present in each case between the outer wall of the valve slide and the inner wall of the housing, and no sealing means are present between the inner wall of the housing and the outer wall of the valve slide.

16 Claims, 5 Drawing Sheets

(56) References Cited

FOREIGN PATENT DOCUMENTS

| DE | 202011050667 U1 | 11/2011 |
| DE | 102011108430 A1 | 2/2012 |
| DE | 202011109211 U1 | 3/2012 |
| EP | 1672259 A1 | 6/2006 |
| GB | 1410406 | 10/1975 |
| WO | WO 01/88420 A1 | 11/2001 |

* cited by examiner

PIPE BREAK VALVE DEVICE

CROSS-REFERENCE TO RELATED PATENT APPLICATIONS

This application claims the benefit of German Patent Application No. 102011108430.8, filed Jul. 26, 2011, which is incorporated by reference herein.

FIELD OF THE INVENTION

The present invention relates to a pipe break valve device for a flow medium, in particular hydraulic oil, within a line system, with a housing through which the flow medium flows, with an inlet connection, in particular for a pipe, and with an outlet connection, in particular for a flexible line, in the normal operating state the flow medium flowing through the interior of the housing, a valve slide, displaceable counter to the action of elastic means, for shutting off the pipe break valve device in the event of a line break or leakage, and a throttle device with throttle ducts and with a spatial volume which is in communication connection with the interior of the housing on the inlet side and on the outlet side via the throttle ducts, the throttle device preventing an abruptly occurring pressure fluctuation from causing a shut-off by the valve slide and, in the event of a line break, allowing shut-off by the valve slide.

BACKGROUND OF THE INVENTION

One application of such pipe break valve devices is in heavy trucks having a plurality of axle lines, the pipe break valve units acting as pilot switching valves on the axle balancing cylinders. The axle balancing cylinders are installed movably, so that a flexible line, in particular a high-pressure hose piece, is inserted as a supply line for the flow medium, for example hydraulic oil, upstream of the cylinder. The throttle device has the effect that pressure changes briefly occurring abruptly, for example on account of unevennesses in the road, do not cause the valve to close. Furthermore, the throttle device has the effect that, when a persistent differential pressure occurs between the inlet connection and the outlet connection, which happens, for example, when a hose bursts, the pipe break valve shuts off passage sealingly as a result of the corresponding transverse movement of the valve slide.

FIG. 5 illustrates diagrammatically in cross section a known pipe break valve device 60 of the applicant. The pipe break valve device 60 has a housing 62 which in FIG. 5 possesses an inlet connection 64 on the underside and an outlet connection 66 on the top side. The two connections 64, 66 are in communication connection inside the housing 62, the flow direction of the medium, for example hydraulic oil, being identified in FIG. 5 by the arrow F.

In the housing 62 there is a continuous transverse bore 80, within which a valve slide 68 is mounted displaceably in the transverse direction Q. In each case on the left and on the right of the valve slide 68 there is a sealed-off oil space 70.1, 70.2 which is in communication connection with the flow cross section of the housing via throttle ducts 74, in each case both with the inlet connection region and with the outlet connection region. The first duct region of the throttle ducts has a very small bore cross section which ultimately gives rise to a throttle effect. Inside the oil spaces 70.1, 70.2 there are in each case elastic means 72.1, 72.2 which act on the valve slide 68 and, in the normal operating state, hold it in the open state.

In the normal operating state, both oil spaces 70.1, 70.2 are filled correspondingly with hydraulic oil and, as already mentioned, are in communication connection with the interior of the flow cross section. The rigidity of the elastic means 72.1 and 72.2 is in this case set such that, if a pressure difference occurs when the flow medium flows through the housing 62, the valve slide 68 is in the open position.

The throttle ducts 74.1, 74.2 and oil spaces 70.1, 70.2, in conjunction with the elastic means 72.1, 72.2, constitute a throttle device which prevents the valve from shutting off in the event of a pressure peak briefly occurring suddenly, since the filling state of the oil spaces 70.1, 70.2 does not change substantially on account of the given throttle action, and therefore the valve slide 68 is held in its position. If, then, for example, a line break occurs on one side, that is to say a situation where a pressure difference between the inlet region and outlet region is present for a relatively lengthy period of time, oil flows via the throttle duct 74.1 into the right oil space 70.1 (arrow F1) and at the same time oil flows out of the left oil space 70.2 via the throttle ducts 74.2 into the outlet region (arrow F2), thus giving rise ultimately to a displacement of the valve slide 68 to the left, the valve slide 68 shutting off the throughflow after a stipulated displacement travel is reached. The valve slide 68 executes a displacement movement to the left when the line connected on the top side breaks. If the line connected on the underside breaks, the valve slide 68 executes a displacement movement to the right in the transverse direction Q in order to shut off the throughflow.

The known pipe break valve device ensures permanently reliable functioning. The relatively complicated structural set-up, the multiplicity of components and the complex geometry necessitate a high outlay, and therefore, in terms of economical production, high costs are incurred which have to be reflected in the price.

DE 10 2009 043 568 A1 describes a hydraulic safety valve for shutting off a first duct, connectable to a pump, with respect to a second duct, connectable to a hydraulic consumer. In this case, two coaxially arranged separate blocking pistons are mounted displaceably in the axial direction, are acted upon in each case by the spring force of a spring and can be transferred, counter to the spring force of the respective spring, from an open position into a blocking position as a result of the overshooting of a flow velocity of the hydraulic medium and of a pressure difference thereby occurring. The ducts are shut off by means of this movement. In this case, there is a damping device for the damped or time-delayed closing of the blocking pistons. The damping device is designed as a chamber which is in communication connection with the fluids via a throttle bore. The throttle chamber therefore necessarily has to be vented. For this purpose, corresponding venting ducts are provided which can be closed and, if required, opened by means of screws. On account of the chosen design, it is necessary that sealing means are present between the inner wall of the blocking piston and the inner wall of the housing. These sealing means which are present may present problems, since, if not actuated for a lengthy period of time, they may seize up due to ageing influences and may be able to therefore no longer ensure their functioning when required. Since this safety valve necessarily has to be vented, it is necessary to ensure, for example on a vehicle, a straightforward situation where the installed safety valve is accessible in order to carry out venting.

German Utility Model specification DE 20 2011 050 667 U1, published at a later date, relates to a hydraulic pipe, line or hose break safety shut-off valve for shutting off a supply line duct, connectable to a pump, with respect to an outflow line duct, connectable to a hydraulic consumer. The supply line duct and outflow line duct issue into an axial bore, extending in the direction of an axial axis, of a valve housing, in which axle bore is mounted displaceably a blocking piston which is acted upon in the axial direction by spring force of a spring, with the result that the blocking piston is held in an open position up to a specific limit flow velocity of a hydraulic medium which amounts to a value greater than zero. Here too, a separate damping chamber is connected via throttle ducts and has to be vented via ventilation ducts in order to ensure permanently reliable functioning. The set-up of this valve is relatively complicated and therefore cost-intensive. Moreover, even here, it is absolutely necessary that sealing means are present between the outer wall of the moveable blocking piston and the inner wall of the housing, these sealing means possibly entailing the problems already described above.

German Laid-Open Publication DE 2 352 826 discloses a hydraulic pipe break valve closing in a damped manner, with a blocking piston, held open by a compression spring, between a consumer connection and a connection leading to the pump and return. In this case, via a relatively complicated duct system, a damping space is in communication connection with the space of the blocking piston by means of a member which reduces the throughflow cross section of at least one bore under the action of a pressure drop building up between the connections and displacing the blocking piston counter to the action of the compression spring, after this displacement has commenced. The damping action is consequently adjustable. This valve also has a highly complex set-up and, in terms of economical use, can therefore be used to only a restricted extent.

U.S. Pat. No. 6,513,545 B2 discloses a nonreturn valve, in particular suitable for gas lines, in which a set screw is used which acts on a spring in order to set the spring force of the latter and therefore its recoil characteristic. This valve device has no damping properties of any kind and is therefore unsuitable for the use of the pipe break valve device according to the application, for example in heavy motor trucks, since it is not capable of maintaining "permissible" pressure fluctuations while at the same time continuing to fulfill its function.

U.S. Pat. No. 3,995,656 describes a valve for a high-pressure gas line which is designed as a regulating valve and does not present any safeguard against a hose break. Moreover, this valve also has no damping properties.

U.S. Pat. No. 5,507,466 discloses a valve device which is capable of shutting off the valve automatically after a stipulated fluid volume has flowed through. The valve slide employed for this purpose is mounted longitudinally displaceably and is located within a continuous recess. By means of a valve of this type, it is possible to carry out metering of a volume. As soon as this volume is reached and the consumer-side port is closed, the valve slide moves back into its initial position, since it is under the action of a spring force, and is then in the open state, in order once again to dispense a stipulated volume quantity, as required. As soon as the valve slide is stationary, for example as a result of the shut-off of the outflow duct, it moves back into its initial position. Here too, sealing means are arranged between the outer wall of the valve slide and the inner wall of the housing in order to ensure permanently reliable functioning. The valve illustrated contains a relatively large number of additional components and also ensures a nonreturn function, that is to say, if high flow velocities suddenly occur, closing is initiated by the valve slide.

U.S. Pat. No. 2,699,799 describes a nonreturn valve in which the valve slide is under the influence of a spring force and is arranged within a continuous recess in the housing. This valve automatically ensures throughflow under low pressure in one of the directions and shuts off as soon as a pipe pressure prevails in the other direction.

EP 1 672 259 A1 discloses a safety valve in which a valve slide is present longitudinally displaceably within a continuous recess. The valve slide is under the action of a spring force which is arranged in a damping chamber. The damping chamber influences the displacement travel of the valve slide under specific preconditions. The valve slide itself is sealed off with respect to the inner wall of the housing of the valve via special sealing elements. Here too, because of the sealing elements present, there is the problem regarding permanently reliable functioning, in particular regarding non-actuation of the valve slide which lasts for a relatively lengthy period of time, which may influence the action of the sealing means and, in particular, required friction values which are to ensure functioning are no longer available, so that, overall, functionality as required is then no longer ensured.

SUMMARY OF THE INVENTION

Proceeding from the prior art mentioned, the object or technical problem on which the present invention is based is to specify a pipe break valve device of the type initially mentioned which can be produced economically, can be mounted in a simple way, has fewer components and at the same time ensures permanently reliable functioning. The object on which the invention is based is, furthermore, to specify a pipe break valve device which has an extremely compact set-up, can be installed easily even under confined conditions of space and has a relatively low weight. Furthermore, automatic venting is to be ensured, so that accessibility after installation may be dispensed with. Moreover, simple adjustability in respect of the response characteristic of the valve device is to be possible.

The pipe break valve device according to the invention is distinguished from the prior art in that the housing has a recess continuous in the flow direction, the valve slide is arranged displaceably in the flow direction in the recess, and the spatial volume of the throttle device is arranged at least in regions between the outer wall of the valve slide and the inner wall of the housing, the throttle ducts present on the inlet side and on the outlet side are formed by a first gap and a second gap which are present in each case between the outer wall of the valve slide and the inner wall of the housing, and no sealing means are present between the inner wall of the housing and the outer wall of the valve slide.

An especially preferred refinement of the pipe break valve device according to the invention is distinguished in that the throttle ducts are formed by gaps or recesses present on/in the wall of the valve slide and/or of the housing.

In terms of an especially compact type of construction, an especially advantageous development of the pipe break valve device according to the invention is distinguished in that the elastic means are arranged in the spatial volume and in the normal operating state hold the valve slide in the open position, the elastic means preferably being designed as successfully proven helical springs.

A refinement which is especially advantageous in manufacturing terms and makes it possible to have a low manufacturing outlay is distinguished in that the valve slide has an upper flange bearing against the housing inner wall, and an inwardly projecting portion bearing against the outer wall of the valve slide is present, spaced apart in the flow direction, on the inner wall of the housing, and, in particular, the elastic means are arranged between the flange and the projecting portion.

To ensure permanently reliable functioning, it proves advantageous to design the pipe break valve device according to the invention such that the valve slide has in an end region a valve disk which, in the event of a line break, comes sealingly into bearing contact with a valve seat present on the inner wall of the housing, the displacement of the valve slide being made possible by the escape of fluid medium out of the spatial volume via the throttle ducts on account of the pressure difference present in the event of a line break.

In terms of an especially economical manufacture, an advantageous design variant is distinguished in that at least one upper and one lower throttle gap are integrally formed respectively on the outwardly pointing end wall of the flange and/or on the inwardly pointing end wall of the projecting portion, and in this connection, in a preferred refinement, the upper and/or lower throttle ducts may be present radially in a stipulated angle grid.

To adapt the throttle function with regard to its action in time, it is also possible, according to an especially advantageous development of the pipe break valve device according to the invention, to provide further throttle ducts in the wall of the valve slide essentially transversely to the flow direction.

In order to achieve a flow cross section, the flow resistance of which is kept low, an advantageous refinement is distinguished in that the valve slide has in the flow direction an open blind hole bore which has further through bores in the end region of the blind hole bore.

For simple mounting of the entire pipe break valve device on site, it is especially advantageous that the housing has on the outside a polygonal circumferential contour, in particular hexagonal circumferential contour, so that it is easily possible to attach a tool.

The pipe break valve device according to the invention is distinguished overall, as compared with the known pipe break valve devices with damping, especially advantageously in that permanently reliable functioning with damping properties can be achieved by means of fewer components, to be precise: a valve slide with a valve disk having additional bores, a housing with a hexagonal circumferential contour, a compression spring for setting the position of the valve slide in nominal load operation, and a securing ring.

An essential idea of the pipe break valve device according to the invention is to configure the valve slide so that it is displaceable not transversely to the flow direction, as in the known pipe break valve devices, but in the flow direction, so that a highly compact set-up can be achieved in which the oil space for the throttle device is arranged around the valve slide in a simple way. Due to the small number of components, the manufacturing costs are markedly reduced. Furthermore, because of the simple structural set-up for some components (for example, the valve slide, housing and valve disk), fully automatic manufacture is possible. The other components (elastic means, securing ring) are series-produced components. Mounting the few components is simple and can be carried out quickly.

Furthermore, the pipe break valve device according to the invention has a markedly lower weight than the known devices and has to be fastened or attached at the place of use merely by simple screwing. The compact type of construction also allows use under spatially very confined conditions.

In the known pipe break valve devices, in the event of a trigger, that is to say, for example, in the event of a line break, the hydraulic oil has to flow into an oil space via the damping ducts and flow out again via the further oil space, whereas, in the pipe break valve device according to the invention, in the event of a trigger the hydraulic oil merely has to flow out of a spatial volume, thus giving rise to substantially lower susceptibility to the risk of contamination.

Moreover, the pipe break valve unit according to the invention makes it possible to have a design where no sealing means of any kind have to be employed, particularly because of the use of gaps as throttle ducts. The problem of the ageing of the sealing means is thereby avoided completely. Permanent functioning capacity is ensured.

Since the throttle chamber is connected to the throughflow cross section via two gaps, automatic venting of this chamber by means of the fluid throughflow takes place, so that additional venting ducts may be dispensed with completely. Practical tests showed that, in use, self-venting by the flow of the fluid is afforded after a few seconds. As a result, the venting work which usually has to be carried out by the user is avoided entirely. A further major advantage of automatic venting is that the valve no longer has to be freely accessible in the installed state in order to carry out venting work. On account of this, it is possible to have basically different superstructures, that is to say vehicle body design engineers benefit in this regard from greater freedoms of design.

Overall, a highly compact pipe break valve device which can be produced economically, can be installed in a simple way and ensures permanently reliable functioning is available.

An especially advantageous refinement of the pipe break valve device according to the invention is distinguished in that a first securing unit located on the underside, as seen in the flow direction, in particular a step of the inner wall of the valve slide, is present in the region of the inner wall of the blind hole bore of the valve slide, and a spaced-apart second securing unit located on the top side, as seen in the flow direction, in particular a second recess, is present in the inner wall of the valve slide, and suitable for a securing ring, for the selectively releasable lockable arrangement of a throttle disk with at least one throttle recess between the two securing units, which throttle disk narrows the cross section of the blind hole recess.

In order to ensure optimal accessibility, according to a preferred refinement the throttle disk is arranged in the upper open end region of the blind hole bore of the valve slide.

The use of a throttle disk of this type makes it possible in the simplest way to set the response characteristic by using a throttle disk having a throttle recess diameter assigned optimally to the respective application. The throughflow of the fluid ultimately generates the force which moves the valve slide. Hitherto, setting has had to be carried out via the spring position or by varying the diameter of the throttle orifices, this being highly complicated. According to the invention, by the use of the throttle disk, the throughflow resistance overall is varied and therefore the response characteristic of this valve slide is adapted to the respective application in a simple way. One disadvantage with regard to adjustability in the case of throttle bores which are present is their high tolerance sensitivity. To set the response characteristic, for example, changes in the throttle bore must be carried out in the region of steps of, for example, 0.1 mm. On account of possible contaminations which may occur, the tolerance sensitivity may rise drastically. In many instances, in such solutions, reliable triggering in the case of relatively low throughflows is no longer possible. In contrast to this, using the throttle disk according to the invention it is also easily possible to use the valve device in the case of low throughflows, while at the same time adjustability simply by exchanging the throttle disks having different throttle recess diameters can also follow.

Thus, for example, manufacturers of smaller vehicles mostly also use smaller cylinders and therefore have lower throughflows. When hitherto existing hose break safeguards are used, therefore, problems with regard to the response characteristic may arise. With the novel valve according to the invention, however, a practicable solution is available even for these situations.

Further embodiments and advantages of the invention will be gathered from the features further from the exemplary embodiment given below. These features may be combined with one another in any desired way, in so far as they are not obviously mutually exclusive.

BRIEF DESCRIPTION OF THE DRAWINGS

The invention and also advantageous embodiments and developments of this are described and explained in more detail below by means of the examples illustrated in the drawings. The features to be gathered from the description and the drawings may be adopted, according to the invention, individually in themselves or severally in any desired combination. In the drawing.

DETAILED DESCRIPTION OF THE INVENTION

Figure 1:
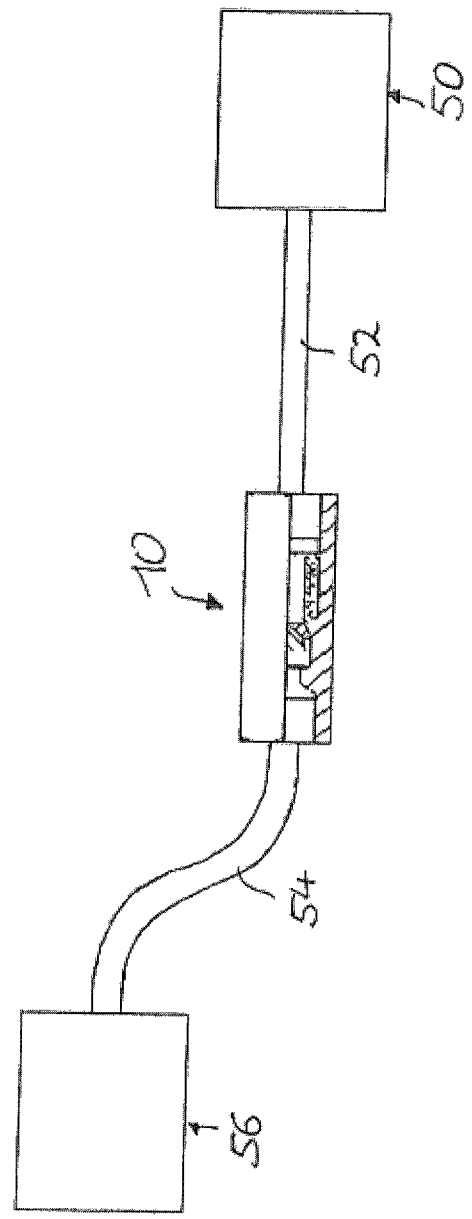
FIG. 1 is a highly diagrammatic illustration of the use of a pipe break valve device according to the invention connected between a pressure source and a consumer, a pipe running between the pressure source and valve device and a hose running between the valve device and consumer.

A pipe break valve device 10 in a practical application is illustrated highly diagrammatically in FIG. 1. The pipe break valve device 10 is connected in one end region thereof to a compressed-air source 50 via a pipe 52. Connected to the opposite, other end region is a flexible hose 54 which leads to a consumer 56, for example a hydraulic cylinder. The pipe break valve device 10 serves, in the event of a hose break of the hose 54, to shut off the throughflow of the flow medium through the pipe break valve device 10, although at the same time it must be ensured that, in the case of pressure peaks briefly occurring within the line system, the pipe break valve device 10 remains open and does not carry out any shut-off of the line system.

Figures 2, 3, 4:
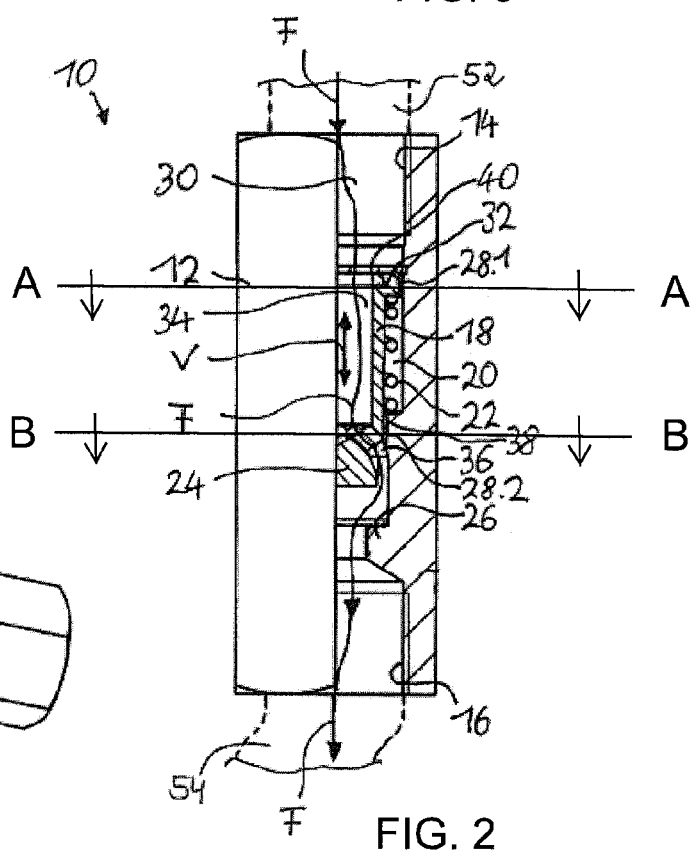
FIG. 2 is a diagrammatic half-sided longitudinal cross section and half-sided top view of a pipe break valve device according to the invention with a valve slide displaceable in the flow direction and with an oil space.
FIG. 3 is a diagrammatic end view of the pipe break valve device according to FIG. 2.
FIG. 4 is a diagrammatic perspective view of the pipe break valve device according to FIG. 2.
Figure 2A:
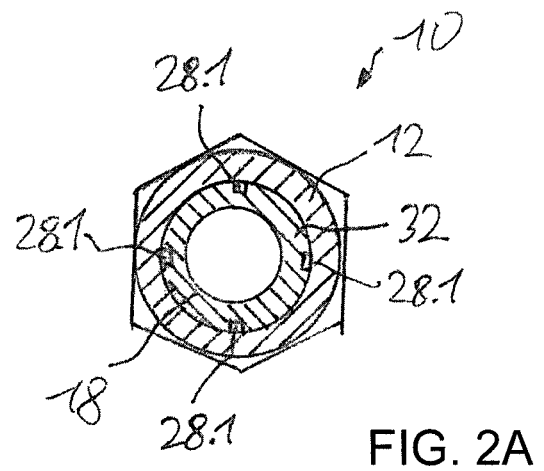
FIG. 2A is a cross sectional view cut along A-A in FIG. 2 at the level of a flange 32.
Figure 2B:
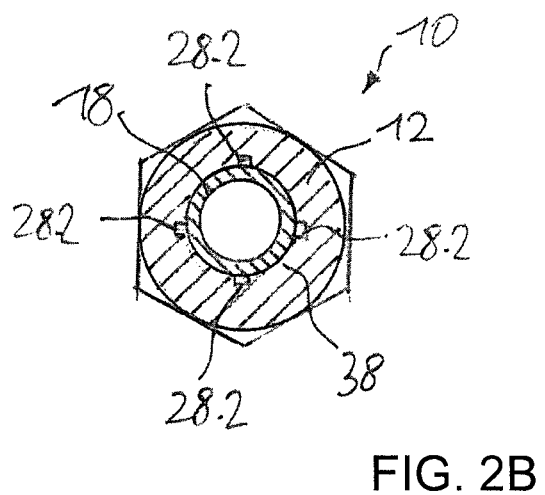
FIG. 2B is a cross sectional view cut along B-B in FIG. 2 at the level of a projecting portion 38.
Figure 5:
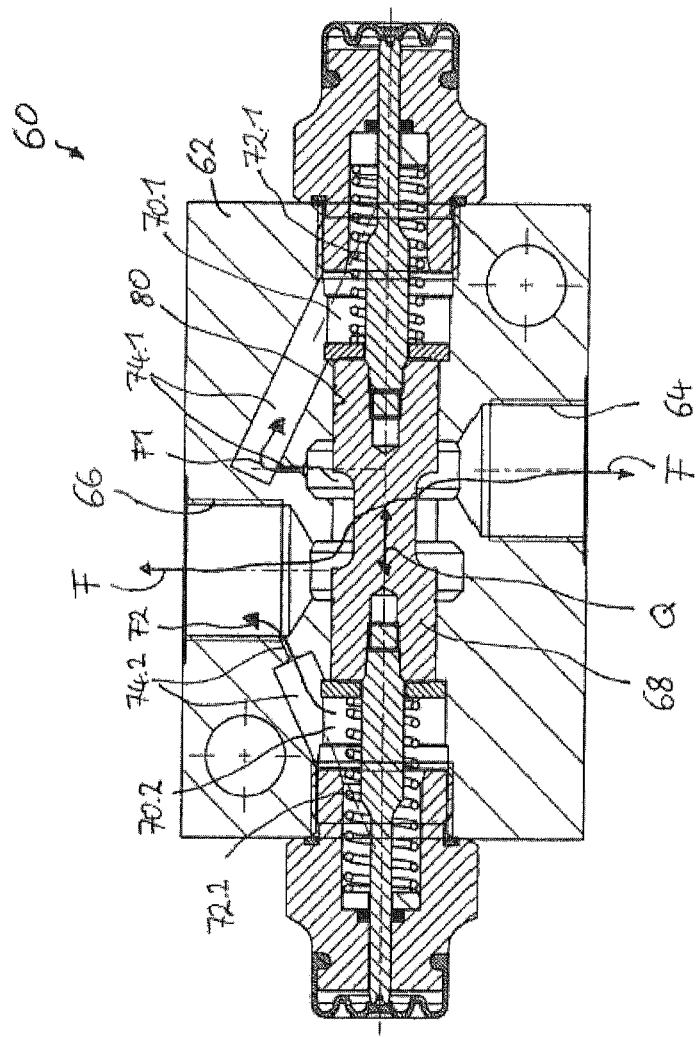
FIG. 5 is a diagrammatic cross section through a pipe break valve device known from the prior art with a valve slide displaceable in the transverse direction and with two oil spaces connected via throttle ducts.

An exemplary embodiment of a pipe break valve device 10 according to the invention is illustrated diagrammatically in FIGS. 2 to 4. The pipe break valve device 10 according to the invention is designed to be highly compact and with fewer components. As is clear from FIG. 4, the pipe break valve device 10 possesses a compact housing 12 with a hexagonal outer circumferential contour. The pipe break valve device 10 according to the invention is formed structurally within this compact housing 12.

The housing 12 of the pipe break valve device 10 according to the invention possesses a continuous recess 30 (see FIG. 2), within which a valve slide 18 is arranged so as to be longitudinally displaceable (see arrow V) in the flow direction and counter to the flow direction (the flow direction is illustrated in FIG. 2 by the arrow F). In the upper end region in FIG. 2, the inner wall of the recess 30 has an inlet connection 14 which is suitable for connecting a pipe 52 coming from the pressure source 50. In the exemplary embodiment illustrated, the inlet connection 14 is designed as an internal thread. In the opposite end region, the housing 12 possesses an outlet connection 16 which is likewise designed as an internal thread and to which a flexible hose 54 can be connected.

The valve slide 18 possesses in its upper region an outwardly projecting upper flange 32 and has inside it an upwardly open blind hole bore 34. A valve disk 24 is connected in the lower region below the blind hole bore 34, through orifices 36 for the flow medium, which are present in grid form radially in the circumferential direction, being clearly present between the wall of the valve slide 18 and the valve disk 24, so that, in the operating state, the flow medium can flow from the top downward through the pipe break valve device 10.

FIGS. 2 to 4 illustrate the pipe break valve device 10 in a normal operating state with regard to the position of the valve slide 18.

The outer end wall of the flange 32 bears against the inner wall of the recess 30 of the housing 12. Below the flange 32 there is on the inner wall of the housing 12 an inwardly projecting portion 38 which bears against the outer wall of the valve slide 18. A spatial volume 20, in particular an oil space, is thereby formed in the region surrounded by the flange 32, the projecting portion 38, the outer wall of the valve slide 18 and the inner wall of the housing 12 and is in communication connection with the interior of the housing 12, that is to say with the flow medium, via upper throttle ducts 28.1, present on the end face of the upper flange 32, and lower throttle ducts 28.2, present on the outer end face of the projecting portion 38. In the operating state, this volume space 20 is filled with flow medium.

At the same time, within the spatial volume 20, elastic means 22 are present which are designed as a helical spring and are supported on the top side of the projecting portion 38 and the underside of the flange 32.

Directly above the valve slide 18, on the inner wall of the housing 12, a securing ring 40 is introduced, against which the elastic means 22 press the valve slide 18 in the operating state. The spring force of the elastic means 22 is in this case selected such that, in the normal operating state, the valve slide is in the open position illustrated in FIG. 2.

Furthermore, an inwardly pointing valve seat 26 is present, below the projecting portion, on the inner wall of the housing 12.

As already described, the spring force of the elastic means 22 is selected such that, in spite of the pressure differences occurring in the operating state on account of the existing flow duct structure, the valve slide 18 is pressed upward against the securing ring 40. In this state, the spatial volume 20 is filled with flow medium. If, then, an increased volume flow occurs briefly, the position of the valve slide 18 does not vary to the extent that throughflow in the flow direction F is no longer possible, since damping is achieved by means of the throttle ducts 28.1, 28.2, so that abrupt pressure differences on account of brief volume flow peaks do not cause the pipe break valve device 10 to be shut off.

If, then, leakage or a hose break occurs at the hose 54, this likewise signifies an increased pressure difference between the inlet side and outlet side of the pipe break valve device 10, which pressure difference, however, persists in time. On account of this pressure difference, the valve slide 18 is displaced downward in the direction V counter to the action of the elastic means 22, since the flow medium can in the course of time escape out of the spatial volume 20 via the lower throttle ducts 28.2. As soon as the valve disk 24 of the valve slide 18 bears on the valve seat 26 of the housing 12, the shut-off position is reached and throughflow of the flow medium through the valve device 10 is interrupted.

In the event of a major leakage or hose break, the valve slide 18 thus reacts with some time delay and shuts off the pipe break valve device 10 a short time after the trigger event has occurred, volume flow peaks or pressure differences which briefly occur not triggering any shut-off.

Figure 6:
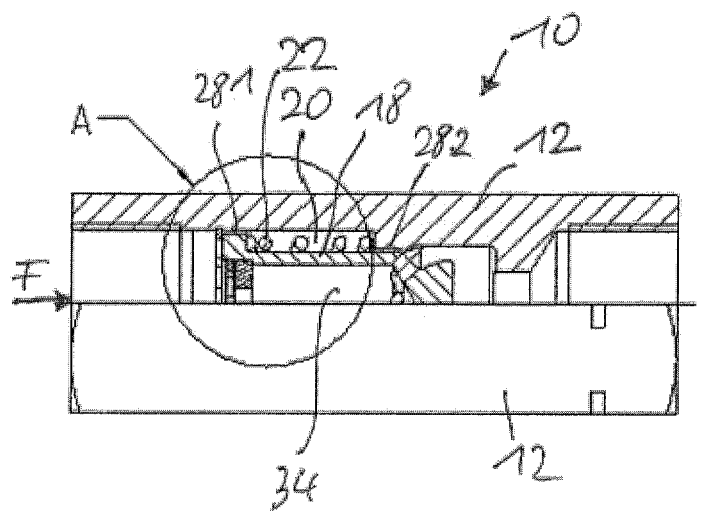
FIG. 6 is a diagrammatic half-sided longitudinal cross section and half-sided top view of the pipe break valve device according to the invention, as shown in FIG. 2, a throttle disk being inserted in the throughflow cross section inside the valve slide.
Figure 7:
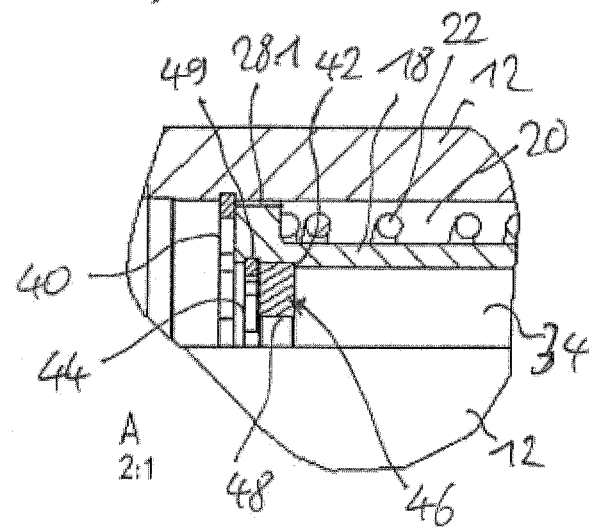
FIG. 7 is, as a detail, a diagrammatic sectional illustration of the detail A of FIG. 6.
Figure 8:
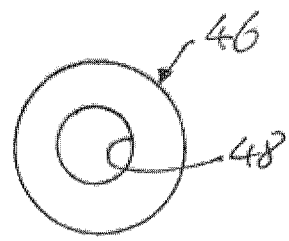
FIG. 8 is a diagrammatic top view of a throttle disk which is arranged in the valve slide of the pipe break valve device according to FIGS. 6 and 7.

FIGS. 6 and 7 illustrate in an especially advantageous development of the pipe break valve device 10 illustrated above. Identical components bear the same reference symbol and are not explained again. The essential difference from the pipe break valve device 10 detailed above is that a throttle disk 46 is arranged in the upper open end region of the blind hole bore 34 of the valve slide 18 and has a continuous throttle recess 48, by means of which the throughflow cross section is reduced in relation to the inner wall of the valve slide 18.

To secure the position of throttle disk 46, there is on the top side a second securing ring 44 which is mounted in a groove 49 of the inner wall of the valve slide 18. This second securing ring 44 may be, for example, a Seeger ring. On the underside, the throttle disk 46 is mounted on a step integrally formed on the inner wall of the valve slide. The clear distance between the step 42 and the underside of the second securing ring 44 corresponds essentially to the thickness of the throttle disk 46.

The throttle disk 46 is accessible from above in a simple way and can easily be exchanged, in that, first, merely the second securing ring 44 and the throttle disk 46 are removed, then the new throttle disk 46 is inserted and thereafter the second securing ring 44 is introduced again. It is thereby possible in the simplest way to adapt the response characteristic of the pipe break valve device 10 to the respective requirements. This is implemented in that, depending on the application, throttle disks 46 having different diameters of the throttle recess 48 are used. Complicated setting work, as in the prior art, to be precise the setting of the spring or variations of throttle ducts, may be dispensed with completely. The setting work is so simple that it can be carried out even by the user himself, in that a set of throttle disks 46, each with a different diameter of the throttle recess 48, is made available to him. An additional further essential advantage is that measures for venting the oil space 20 (throttle space) may be dispensed with completely, since automatic self-venting takes place during operation via the two gaps 28.1 and 28.2.

The pipe break valve device 10 according to the invention is an extremely compact component of low weight and with an extremely small number of components which can be manufactured fully automatically (for example, the housing 12, valve slide 18 and valve disk 24) or are available as series-produced components (elastic means 22, securing ring 40), while the use of sealing means may be dispensed with entirely, so that very low manufacturing costs can be implemented, simple mounting is possible and, furthermore, permanent reliable functioning is ensured. Furthermore, automatic venting is ensured, this affording major advantages in terms of the possible installation situations, since subsequent accessibility is no longer necessary. Due to the possibility of the extremely simple use of throttle disks 46 in each case with throttle recesses 48 adapted to the individual case, adaptation to the respective application which can be carried out extremely simply can be implemented by the simplest means and measures.

LIST OF REFERENCE SYMBOLS

10 Pipe break valve device
12 Housing
14 Inlet connection for 52
16 Outlet connection for 54
18 Valve slide
20 Spatial volume (oil space)
22 Elastic means
24 Valve disk
26 Valve seat
28 Throttle duct
28.1, 28.2 Upper and lower throttle ducts (gaps)
30 Recess of 12
32 Upper flange
34 Blind hole bore
36 Through orifice
38 Projecting portion
40 Securing ring
42 Step
44 Second securing ring
46 Throttle disk
48 Throttle recess of 46
49 Second recess
F Flow direction
V Displacement direction
50 Compressed air source
52 Pipe
54 Hose, flexible line
56 Consumer
60 Pipe break valve device
62 Housing
64 Inlet
66 Outlet
68 Valve slide
70 Oil space 0.1, 0.2
72 Elastic means 0.1, 0.2
74 Throttle ducts 0.1, 0.2
80 Transverse bore

The invention claimed is:

1. A pipe break valve device for a flow medium including hydraulic oil used in a line system, said pipe break valve device comprising:
   a housing, through which the flow medium flows, containing an inlet connection that is connected to a pipe and an outlet connection that is connected to a flexible line;
   a valve slide which is displaceable in a direction counter to an action of an elastic portion and is arranged to shut off the pipe break valve device in case of a line break or leakage, said valve slide having a flange bearing against an inner wall of the housing;
   a throttle device that has throttle ducts and a spatial volume, said throttle device being configured to communicate with an interior of the housing on an inlet side and on an outlet side of the valve device via the throttle ducts, and to prevent an abrupt pressure fluctuation resulting from a shut-off caused by the valve slide, wherein;

the flow medium is configured to flow through the interior of the housing in a normal operating state, the housing has an inwardly projecting portion on its inner wall bearing against the outer wall of the valve slide and has a recess continuous in a flow direction, the valve slide is arranged displaceably in the flow direction in the recess, the spatial volume is arranged in regions between an outer wall of the valve slide and the inner wall of the housing, the throttle ducts are placed on the inlet side and on the outlet side and are respectively provided as a form of a first channel, which is formed between the flange and the inner wall of the housing, and a second channel, which is formed between the outer wall of the valve slide and the inner wall of the projecting portion, no sealing is provided between the inner wall of the projecting portion, and the outer wall of the valve slide;

wherein the elastic portion is arranged in the spatial volume, said elastic portion holding the valve slide in an open position during the normal operating state;

wherein an inlet side end of the spatial volume is defined by a surface of the flange facing the outlet side, and an outlet side end of the spatial volume is defined by a surface of the projecting portion facing the inlet side.

2. The pipe break valve device according to claim 1, wherein the elastic portion is designed as a helical spring.

3. The pipe break valve device as claimed in claim 1, wherein the projecting portion is spaced apart from the valve slide in the flow direction, and the elastic portion is arranged between the flange and the projecting portion.

4. The pipe break valve device according to claim 1, wherein the valve slide has in an end region a valve disk which, in case of a line break, comes sealingly into bearing contact with a valve seat present on the inner wall of the housing, the displacement of the valve slide being made possible by the escape of fluid medium out of the spatial volume via the throttle ducts on account of the pressure difference present in the event of a line break.

5. The pipe break valve device according to claim 3, wherein the first channel is an upper throttle channel, the second channel is a lower throttle channel, said upper and said lower throttle channels are integrally formed respectively on an outwardly pointing end wall of the flange and/or on an inwardly pointing end wall of the projecting portion.

6. The pipe break valve device according to claim 5, wherein the upper and lower throttle channels gaps are present radially in a stipulated angle interval in a cross section perpendicular to a longitudinal direction.

7. The pipe break valve device according to claim 1, wherein the valve slide has a blind hole bore that is open in the flow direction.

8. The pipe break valve device according to claim 1, wherein further throttle ducts running essentially, transversely with respect to the flow direction are provided in the wall of the valve slide.

9. The pipe break valve device according to claim 1, wherein the position of the valve slide is ensured, in the normal operating state, by a securing ring provided at one end of the valve slide, in conjunction with the elastic portion.

10. The pipe break valve device according to claim 1, wherein the housing is formed in a polygonal shape in its circumferential direction.

11. The pipe break valve device according to claim 7, wherein a first securing unit is provided in the region of the inner wall of the blind hole bore of the valve slide, a second securing unit on the top side, as seen in the flow-direction, is provided in the inner wall of the valve slide, and is suitable for a securing ring, for the selectively releasable lockable arrangement of a throttle disk with at least one throttle recess between the two securing units, in which the throttle disk narrows the cross section of the blind hole recess, and the first securing unit is located at an upstream side in the flow direction with respect to the second securing unit.

12. The pipe break valve device as claimed in claim 11, wherein the throttle disk is arranged, as seen in the flow direction, in an upper open end region of the blind hole bore of the valve slide.

13. The pipe break valve device as claimed in claim 2, wherein the projecting portion is spaced apart in the flow direction from the valve slide, and the helical spring is arranged between the flange and the projecting portion.

14. The pipe break valve device according to claim 10, wherein the housing is formed in a hexagonal shape in its circumferential direction.

15. The pipe break valve device according to claim 1, wherein the width of the spatial volume in a direction perpendicular to a longitudinal direction is substantially constant.

16. The pipe break valve device according to claim 1, wherein the width of the spatial volume in a direction perpendicular to a longitudinal direction is substantially larger than the width of the first channel and/or the second channel in the said direction.

* * * * *